United States Patent [19]
Miyasaki

[11] 3,785,708
[45] Jan. 15, 1974

[54] STATIC FLUID PRESSURE BEARINGS

[76] Inventor: Yasukichiro Miyasaki, 3081, Oizumi, Gakuen-cho, Nerima-ku, Tokyo, Japan

[22] Filed: Oct. 6, 1972

[21] Appl. No.: 295,578

[30] Foreign Application Priority Data

| Oct. 12, 1971 | Japan | 46/79891 |
| Mar. 6, 1972 | Japan | 47/22218 |
| Mar. 6, 1972 | Japan | 47/22219 |

[52] U.S. Cl. .................................. 308/9, 308/122
[51] Int. Cl. .......................................... F16c 17/16
[58] Field of Search ............................... 308/9, 122

[56] References Cited
UNITED STATES PATENTS

| 3,338,643 | 8/1967 | Wilcock | 308/9 |
| 2,449,297 | 9/1948 | Hoffer | 308/9 |
| 3,407,012 | 10/1968 | Siebers | 308/122 |
| 3,703,322 | 11/1972 | Gustafsson | 308/122 |
| 3,606,501 | 9/1971 | Waplington | 308/122 |
| 3,454,311 | 7/1969 | Tomita et al. | 308/122 |

Primary Examiner—Charles J. Myhre
Assistant Examiner—Barry Grossman
Attorney—E. F. Wenderoth et al.

[57] ABSTRACT

In a static fluid pressure bearing, a pressure receiving surface is formed on the outer surface of bearing metals in concentric with the bearing bore and a plurality of pressure receiving pockets of the same number as the bearing pockets are formed on the pressure receiving surface. Respective bearing pockets are communicated with pressure receiving pockets through independent passages. A floating ring is provided to surround the pressure receiving surface with a small clearance therebetween, and a plurality of variable throttle means are formed by the cooperation of the pressure receiving pockets and the floating ring. The fluid under pressure is supplied to the bearing pockets through the variable throttle means to bring back the deviated shaft to the neutral position.

7 Claims, 6 Drawing Figures

STATIC FLUID PRESSURE BEARINGS

BACKGROUND OF THE INVENTION

This invention relates to a static fluid pressure bearing and more particularly to a static fluid pressure bearing of the self-adjusting type.

According to one prior static fluid pressure bearing a control valve is operated by a differential fluid pressure in a pair of opposed bearing pockets for controlling the fluid pressures therein. In such a fluid bearing, however, as the control valve is located on the outside of the bearing structure, the correcting force is decreased due to the fluid resistance in the conduits interconnecting the control valve and respective bearing pockets. Moreover, it is necessary to provide bearing pockets of an even number and the bearing pockets of each pair should oppose each other in exactly diametrically opposite positions, and furthermore, such a control system can not be applied to a bearing having bearing pockets of an odd number.

Although a control system for a bearing haveing bearing pockets of an odd number has been proposed as disclosed in Japanese patent publication No. 5032 of 1961, there are many problems which must be solved.

More particularly, in these prior bearings, because the control valve is located on the outside of the bearing structure, the pressure differential which is created by the control valve in accordance with the pressure differential generated in the bearing pockets due to the lateral displacement of the shaft is decreased by the fluid resistance in the conduits interconnecting the control valve and the bearing pockets when it is applied to the bearing pockets. This leads to the reduction of the correcting force acting upon the shaft thereby decreasing the rigidity thereof. Moreover, as the conduits are relatively long there is a time delay between the creation of the differential pressure in the bearing pockets and the operation of the control valve, that is, the responsibility is lowered. Long conduits also causes degradation of the frequency response characteristic. In the worst case, oscillation or unstable phenomena occure in the control system.

SUMMARY OF THE INVENTION

Accordingly, it is an object of this invention to provide an improved static fluid pressure bearing of high rigidity and capable of applying a strong corrective force against lateral displacement of a rotary shaft.

Another object of this invention is to provide a static fluid pressure bearing including an improved control means capable of quickly responding to the lateral displacement of a rotary shaft so as to quickly correct such displacement.

Still another object of this invention is to provide a static fluid pressure bearing including a high precision control valve of simplified construction and capable of smooth and accurate correction of the lateral displacement of a rotary shaft.

A further object of this invention is to provide an improved control valve for a static fluid pressure bearing capable of rapid correction of the displacement of a rotary shaft not only in the radial direction but also in the axial direction.

Still further object of this invention is to provided an improved fluid bearing in which the control valve responsive to the pressure difference between bearing pockets is self-contained in the bearing structure whereby above described disadvantage caused by an external control valve can be obviated.

According to this invention there is provided a fluid bearing wherein a plurality of circumferentially spaced apart bearing pockets are formed in the bore of the bearing, and a rotary shaft is rotatably supported in the bearing bore with a small clearance by the hydrostatic pressure created in the bearing pockets, characterized in that bearing metal is formed on its outer surface with a pressure receiving surface concentric with the bore, that the pressure receiving surface is formed with a plurality of pressure receiving pockets of the same number as the bearing pockets, that the passages communicating with the respective bearing pockets are opened in the pressure receiving pockets, that a floating ring is mounted on said pressure receiving surface with a small clearance therebetween so that the floating ring can move freely, that a plurality of variable throttling means are formed by the cooperation of the periphery of the pressure receiving pockets and the floating ring so as to supply fluid under pressure to the bearing pockets through the variable throttling means and through said passages.

BRIEF DESCRIPTION OF THE DRAWINGS

These and further objects and advantages of the invention can be more clearly understood from the following detailed description taken in conjunction with the accompanying drawings in which.

DESCRIPTION OF THE PREFERRED EMBODIMENTS

Figure 1:
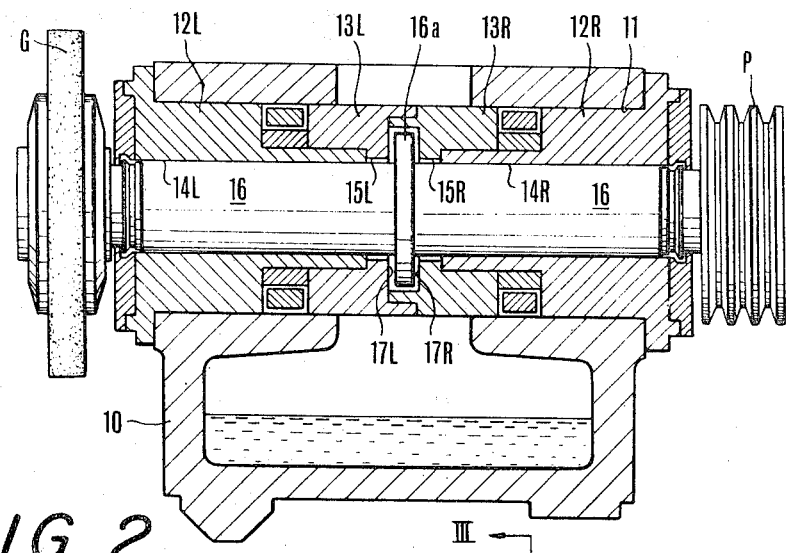
FIG. 1 shows a longitudinal sectional view of a Static fluid pressure bearing structure embodying the invention.

The outline of the novel bearing structure will firstly be described with reference to FIG. 1. The bearing structure shown in FIG. 1 comprises a main body 10 formed with an inner bore 11 in which left and right radial bearing metals 12L and 12R and left and right thrust bearing metals 13L and 13R are securely fitted. Concentric bearing surfacies 14L and 14R are formed on the inside of radial bearing metals 12L and 12R to receive a rotary shaft 16. The inner surfaces 15L and 15R of the thrust bearing metals have a slightly larger diameter than the outer diameter of the shaft 16. The rotary shaft 16 is supported in the radial direction by the bearing surfaces 14L and 14R with a small clearances therebetween. A thrust ring 16a secured to approximately the axial center of the rotary shaft 16 is interposed between the thrust bearing surfaces 17L and 17R formed on the side walls of the thrust bearing metals 13L and 13R with small clearances between the thrust ring 16a and the thrust bearing surfaces 13L and 13R. On the opposite ends of the rotary shaft 16 are mounted a pully P driven by a driving motor, not shown, and a grinding wheel G adopted to grind a workpiece.

The detail of the construction of the fluid pressure bearing structure will be described with reference to FIG. 2 and 3. Since the bearings on the lefthand side and the right hand side have symmetrical constructions, the left hand bearing alone will be described hereunder. A plurality of equally spaced apart pockets 14a, 14b, 14c and 14d are formed in the surface of inner bore 14 of bearing metal 12L. As above described, rotary shaft 16 is received in the bearing bore 14 with a small clearance therebetween so that the shaft is rotatably supported by the static pressures generated in respective bearing pockets 14a, 14b, 14c and 14d.

A bearing ring 18 is fitted over a portion of the periphery of the bearing metal 12L and the bearing ring 18 is secured to the bearing metal 12L together-with the thrust bearing metal 13L also fitted over a portion of the periphery of the bearing metal 12L. Thrust bearing metal 13L is also fitted in bore 11 with a small clearance therebetween so as to define an annular chamber 20 between the radial bearing metal 12L and the thrust bearing metal 13L. The thrust bearing metal 13L and 13R is provided with an annular pockets 21 on the end surface thereof confronting the thrust ring 16a secured to rotary shaft 16 and fluid under pressure $P_0$ is supplied to the annular pocket 21 from a source H through conduits 22 and 23 and a throttle valve 24 to support the rotary shaft 16 in the axial direction.

A plurality of equally spaced apart receiving pockets 29a, 29b, 29c and 29d are formed on the receiving surface 28 at the outer periphery of bearing ring 18 these receiving pockets being communicated with corresponding bearing pockets 14a, 14b, 14c and 14d through passages 30a, 30b, 30c and 30d respectively. Grooves 31a, 31b, 31c and 31d are formed on the opposite ends of the bearing ring 18 at positions corresponding to bearing pockets 29a, 29b, 29c and 29d. Corresponding grooves on both ends, (for example grooves 31c and 31c) are communicated with each other through small openings 32a, 32b, 32c and 32d.

A floating ring 33 is provided to surround the receiving surface 28 on the bearing ring 18 with a small clearance $\Delta t$ therebetween so that the floating ring 33 is floated in the radial direction. The opposite end surfaces of the floating ring 33 oppose the radial bearing 12L and the thrust bearing 13L with clearances which is a little smaller than said clearance $\Delta t$. The outer surface of the floating ring 33 opposes the inner bore 11 with a clearance somewhat larger than said clearance $\Delta t$ for the purpose of providing squeeze damping effect.

It is preferable that the clearance $\Delta t$ is about several microns larger than the clearance between the shaft and the bearings. Thus, where the clearance $\Delta t$ is too large, the floating ring 33 tends to vibrate whereas too small clearance can not assure efficient flow control.

As annular groove 34 is formed on the lefthand end of the floating ring 33. The annular groove 34 is communicated with a wider annular groove 35 on the right-hand surface of the floating ring 33 through a plurality of axial nozzle opening 36a, 36b, 36c and 36d.

A plurality of nozzle openings 37a, 37b, 37c and 37d (openings 37a and 37b are not shown in the drawing) are formed through radial bearing metal 12L to oppose the annular groove 34 so that the fluid under pressure $P_0$ ejected through these nozzle openings flows into annular groove 34 and then into annular groove 35 through nozzle openings 36a, 36b, 36c and 36d in the floating ring 33 thus stably supporting the same in the axial direction, that is in the direction of thrust.

Furthermore, the radial bearing metal 12L is provided with a plurality of fluid supply openings 40a, 40b, 40c and 40d (openings 40a and 40b are not shown in the drawing) which respectively open in lefthand grooves 31a, 31b, 31c and 31d, of the bearing ring 18, and these supply openings 40a, 40b, 40c and 40d are communicated with the conduit 22 respectively through throttles or restrictors 41a, 41b, 41c and 41d (supply openings 40a and 40b and throttles 41a and 41b are not shown in the drawing). Thus, in the novel bearing structure, the fluid under pressure supplied to respective grooves 31a, 31b, 31c and 31d through supply openings 40a, 40b, 40c and 40d flows into respective receiving pockets 29a, 29b, 29c and 29d through clearance $\Delta t$ which acts as a variable throttle means between the bearing ring 18 and floating ring 33. Further, the fluid flows into respective bearing pockets 14a, 14b, 14c and 14d through passages 30a, 30b, 30c and 30d for rotatably support the shaft 16. Of course the floating ring 33 is stably supported in the radial direction by the fluid under pressure supplied to respective bearing pockets 29a, 29b, 29c and 29d.

Figure 3:
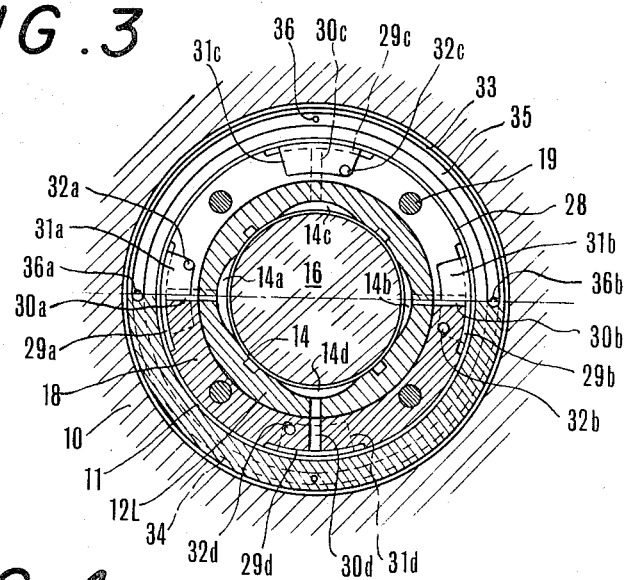
FIG. 3 shows a cross-sectional view taken along a line III — III in FIG. 2.

With this construction, when a large radial load is applied on shaft 16 in a right direction in FIG. 3 to tend it to displace to the right as viewed in FIG. 3 the fluid pressures in bearing pockets 14b and in receiving pocket 29b communicated therewith are increased whereas the fluid pressures in the pockets 14a and 29a are decreased, whereby the floating ring 33 is displaced to the right in responce to the difference in these pressures. However, under these conditions, as the floating ring 33 is displaced the quantity of the fluid supplied to the bearing pocket 14b will be increased whereas that supplied to the bearing pocket 14a decreased with the result that a strong corrective or restoring force is applied upon rotary shaft 16 in the direction toward left. Thus, the rotary shaft 16 will be rapidly restored to the normal position (at the axial center of the bearing bores 14L and 14R). Under these conditions, when the load is zero, the floating ring 33 perfectly restores its normal position. However, when the radial load is still acting, the floating ring 33 will be returned to a balanced position at which the supporting force of the bearing pocket 14b is made larger than that of the bearing pocket 14a in proportion to the load.

Although in this embodiment the annular chamber 20 is communicated with a discharge opening 42, if the diameter of the discharge opening 42 is reduced or if the discharge opening 42 is eliminated, it would be possible to increase further the squeeze damping effect between the floating ring 33 and the bore 11. It should be understood that the floating ring 33 is not always necessary to be provided with annular grooves 34 and 35 and communication openings 36a, 36b, 36c and 36d.

The floating ring 33 is maintained in the floated state without contacting any adjacent elements and without the necessity of providing any rotation preventing means such as a pin. This not only improves the floating property of the floating ring 33 but also ensures quick and smooth application of the corrective or restoring force.

Figure 2:
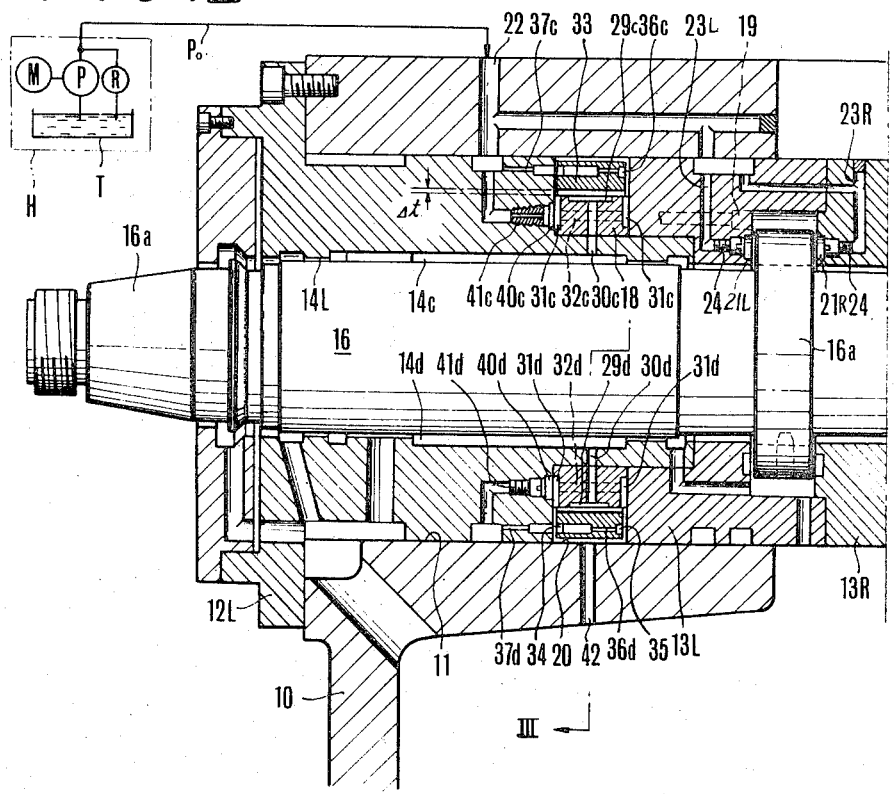
FIG. 2 shows a detailed longitudinal sectional view of a portion of the static fluid pressure bearing structure.
Figure 4:
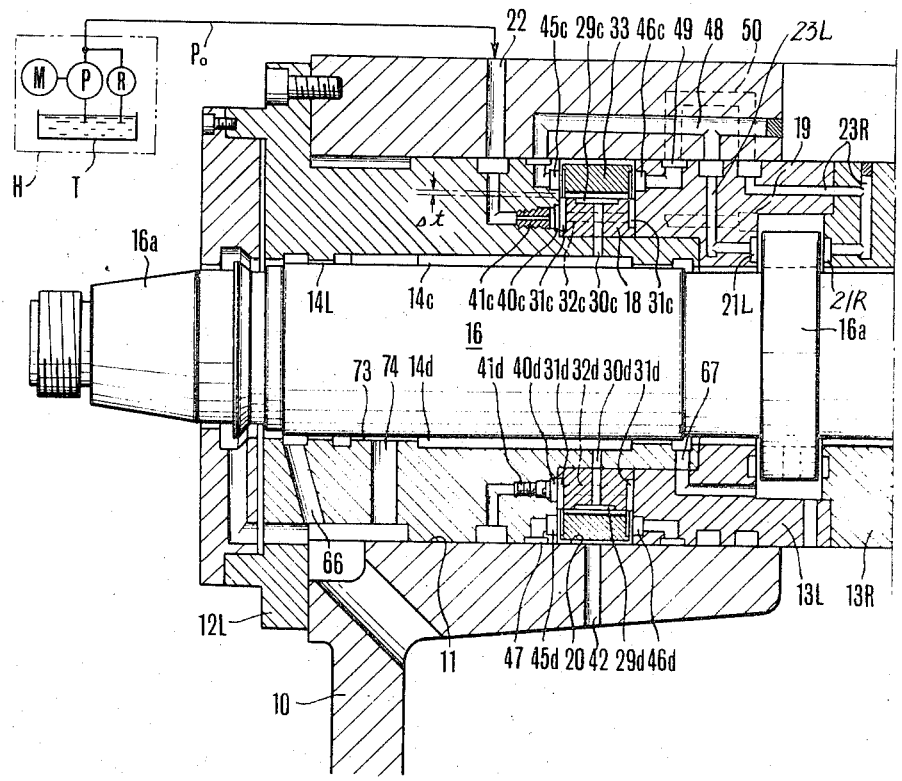
FIG. 4 shows a longitudinal sectional view of a modified embodiment of this invention.

In the modified embodiment shown in FIGS. 4, the component elements which are the same or corresponding to those shown in FIGS. 2 and 3 are designated by the same reference numerals.

The embodiment shown in FIG. 4 differs from the previous embodiment in that a single floating ring 33 is used to correct the axial displacement of rotary shaft 16 just in the same manner for correcting the radial displacement described above.

More particularly, the floating ring 33 which encircles bearing ring 18 with a minute clearance therebetween is constructed to have a simple configuration only having small axial projections on the periphery. Arcuate grooves 45a, 45b, 45c 45d and 46a, 46b, 46c 46d (grooves 45a, 45b, 46a and 46b are not shown in the drawing) which are equally spaced apart in the circumferential direction are formed on the end surfaces of the bearing metals 12L and 13R located on the opposite sides of the floating ring 33. Grooves 45a through 45d are communicated with the bearing pockets 21L of the thrust bearing through annular passages 47, 48 and a passage 23L, whereas the grooves 46a through 46d are communicated with the thrust bearing pocket 21R of the thrust bearing 13R through annular passages 49 and passages 50, 23R. Accordingly, a portion of the fluid supplied to grooves 31a through 31d through the throttle from the supply opening 22 is supplied to thrust bearing pockets 21L and 21R through the clearance between bearing metals 12 and 13 and the floating ring 33.

With this modified construction, when the rotary shaft 16 is displaced a little to the right from the neutral position in FIG. 4 due to a thrust load, the clearance or gap between thrust ring 16a and thrust bearing metal 13R decreases thereby increasing the fluid pressure in thrust bearing pocket 21R and decreasing the fluid pressure in the bearing pocket 21L. The pressure difference thus formed between the left and right bearing pockets 21L and 21R acts upon the floating ring 33 for moving it to the left as viewed in FIG. 4. This increases the clearance between the floating ring 33 and the bearing metal 13L beyond that between the floating ring 33 and the bearing metal 12L whereby the fluid pressure in the thrust bearing pocket 21R is increased to rapidly bring back the rotary shaft 16 to the original or neutral position. If the thrust load is continuously applied, the fluid pressure in the bearing pocket 21R is maintained at the increased value to balance the applied thrust.

Figure 5:
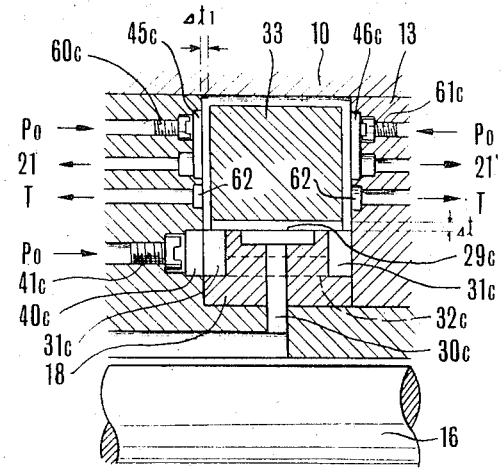
FIG. 5 shows a modification of the control valve used in the embodiment shown in FIG. 4

FIG. 5 shows a modification of the means for correcting the direction of thrust provided for the floating ring shown in FIG. 4. In this modification the floating ring 33 takes the form of a simple ring. It will be clear that a floating ring having the same construction as that shown in FIG. 5 can also be used in the embodiment shown in FIG. 4. In this modification, the fluid under pressure introduced into the groove 31c through a throttle 41c is supplied to only the radial receiving pocket 29c and the fluid under pressure is introduced into the thrust bearing pockets 21L and 21R through another throttles 60c and 61c. Discharge pockets 62 communicated with a reservoir T (see FIG. 2) is opened between grooves 31c and thrust bearing pockets 21L and 21R so as to positively prevent the mutual interference between the fluid under pressure in the grooves 31c and the thrust bearing pockets 21L and 21R. Although in FIG. 5 each of the thrust bearing pockets, grooves and throttles is shown only one it should be understood that there are provided a plurality of such thrust bearing pockets, grooves and throttles just in the same manner as the embodiment shown in FIGS. 1 to 3.

Although in these embodiments, the annular chamber 20 is connected directly with reservoir T through discharge passage 42, a suitable throttle mechanism may be provided between the annular chamber 20 and the reservoir, for instance in the portion of the discharge passage 42 so as to enhance the damping effect between the floating ring 33 and bore 11.

Figure 6:
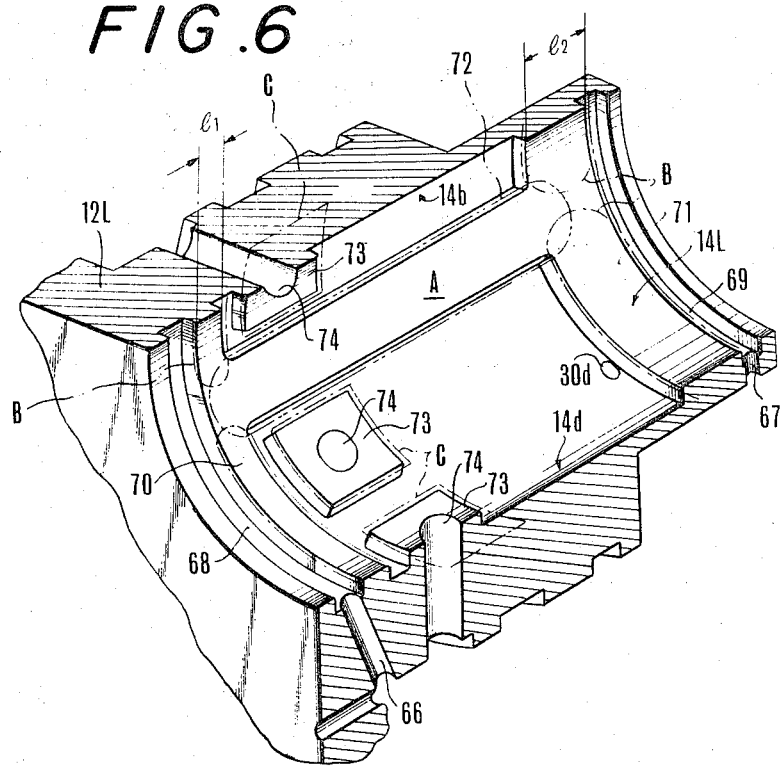
FIG. 6 is a perspective view of a portion of the bearing metal used in the embodiment shown in FIG. 4.

FIG. 6 shows the detail of the construction of the radial bearing metal used in the embodiment shown in FIG. 4. Thus, on the opposite ends of the bearing bore 14L are formed annular discharge grooves 68 and 69 which are communicated with reservoir T (see FIG. 2) through discharge ports 66 and 67, and a plurality of radial bearing pockets 14a through 14d are formed between discharge grooves 68 and 69. The opposite ends of the bearing pockets 14a through 14d are isolated from the discharge grooves 68 and 69 by means of circumferential side lands 70 and 71 and circumferentially adjacent bearing pockets are isolated from each other by means of axial lands 72.

The side land 70 adjacent to the tapered end or the load end of the rotary shaft 16 on which the grinding wheel G (see FIG. 1) is mounted has a narrow width $l_1$ which is lesser than one half of the width $l_2$ of the side land 71 on the opposite side. A plurality of discharge lands 73 are provided in each of the radial bearing pockets 14a through 14d in the portion closer to the load side, the discharge lands 73 being provided with discharge ports 74 connected to the reservoir T.

Considering the entire bearing surface of the radial bearing metal 12L, in the area A of the axial land 72 bounded by phantom line shown in FIG. 6, even when the rotary shaft 16 is devided by any amount, there is no appreciable flow of the fluid under a pressure in this area excepting a small quantity of the fluid which rotates together with the shaft 16 because the fluid pressure difference between the two adjacent bearing pockets on the opposite sides of the area A is ralatively small. Further, the distance between the outer peripheral surface of the rotary shaft 16 and the inner surface of the axial land 72 is small and the areas of these surfaces are much larger than the clearnace between them so that a thin film of the fluid under pressure is formed between these surfaces. Since viscous non-compressible or negligible-small-compressible fluid such as lubricant oil, for example, is used as the fluid under pressure, even when an external force tending to bring the outer surface of the rotary shaft 16 closer to the surface of the axial land 72 is applied to the shaft, the fluid film creates a strong resistance against such external force. In other words, the area A acts as a liquid film damper capable of creating an efficient damping action for preventing the radial displacement of the rotary shaft 16 under a stepped load or a vibratory load.

An area B bounded by phantom line including side lands 70 and 71 and an area C bounded by phantom line including the discharge land 74 operate to control the static pressure in the bearing pockets 14a through 14d by changing the fluid flow from respective radial bearing pockets 14a through 14d to the discharge grooves 68, 69 and the discharge port 74 when the clearance between shaft 16 and bearing surfaces 14L is varied due to the load applied to the rotary shaft 16.

In other words, areas B and C act as pressure compensation zones of the static pressure bearing which are subjected to a pressure compensating action. For example, if the shaft 16 is displaced to the right as viewed in FIG. 3 the static pressure in the bearing pocket 14a decreases whereas that in the bearing pocket 14b increases, thus applying a corrective or restoring force to shaft 16.

Moreover, as the width $l_1$ of the load side side land 70 is smaller than that of the no-load side side land 71 and as the discharge land 73 are located near the load side in the bearing pocket, when the axis of the shaft deviates into an inclined state, large quantity of the fluid flow through the land 71 and the discharge lands 73 is restricted and therefore, the static pressure is quickly increased in the bearing pocket whereby the shaft 16 is moved away from the side land 70 and the discharge land 74 on the load side on which the flow out quantity varies greatly with respect to the amount of displacement of the rotary shaft 16.

As above described incorporation of these improved elements into a mechanism for correcting the displacement of a shaft which utilized a floating ring 33 results in the control of the supply of the fluid by the floating ring as well as the control of the discharge of the fluid by the bearing metals thereby providing a high rigidity bearing structure.

Moreover as the floating ring 33 acts as a self-contained control valve for the pressurized fluid it is possible not only to greatly simplify the construction but also to prevent disadvantages described above caused by the flow resistance afforded by and the length of the conduits interconnecting an outside control valve and the bearing structure.

What is claimed is:

1. A static fluid pressure bearing comprising a casing; a radial bearing metal secured to said casing, said bearing metal being provided with a plurality of radial bearing pockets on its inner surface for fluidically and rotatably supporting a rotary shaft, a plurality of radial pressure receiving pockets provided outside the outer periphery of said radial bearing metal in the same peripheral spacings, said radial pressure receiving pockets being respectively communicated with said radial bearing pockets; a floating ring encircling said radial pressure receiving pockets with a clearance therebetween to be rotatable and movable in a radial direction with respect to said radial pressure receiving pockets, said floating ring and said radial pressure receiving pockets cooperating to form variable throttle means; and means for supplying fluid under pressure to said radial bearing pockets through said variable throttle means and said radial pressure receiving pockets, said floating ring being operable to vary said variable throttle means so as to supply a larger quantity of fluid to at least one of said radial bearing pockets in which fluid pressure is higher than in the other radial bearing pockets in response to a difference of pressure generated in said radial bearing pockets thereby maintaining said shaft at the axis of said radial bearing metal.

2. A static fluid pressure bearing comprising a casing, a radial bearing metal secured to said casing and provided with a plurality of radial bearing pockets for fluidically and rotatably supporting a rotary shaft, a ring encircling said radial bearing metal and secured thereto, said ring being provided with a plurality of radial pressure receiving pockets as the same number as said radial bearing pockets said radial pressure receiving pockets being respectively communicated with said radial bearing pockets, a pair of thrust bearing metals secured in said casing and provided at the opposite sides of a thrust ring of said rotary shaft with clearance therebetween, said thrust bearing metals being provided with thrust bearing pockets which oppose the opposite sides of said thrust ring, said thrust bearing pockets being connected to a source of fluid under pressure; a floating ring sorrounding said ring with a clearance therebetween, said floating ring being supported by said fluid so as to be free to rotate and move in the radial directions; first variable throttle means formed between said floating ring and said radial pressure receiving pockets; and conduit means for supplying fluid under pressure to said radial bearing pockets through said first variable throttle means and said radial pressure receiving pockets, whereby said floating ring is displaced in the radial direction in response to the pressure difference between said radial bearing pockets so as to maintain the axis of said rotary shaft at the center of said radial bearing metal.

3. A static fluid pressure bearing according to claim 2 wherein said floating ring is positioned in annular chamber defined by the end surfaces of said thrust and radial bearing metals and the inner bore of said casing such that said floating ring can move both in the radial and axial directions.

4. A static fluid pressure bearing according to claim 3 wherein said clearances between the end furface of said floating ring and the end surface of said and thrust radial bearing metals is smaller than said clearance between the inner periphery of said floating ring and the outer periphery of said ring.

5. A static fluid pressure bearing according to claim 2 wherein a plurality of equally spaced apart grooves are formed on the opposite end surfaces of said ring at positions respectively opposing said radial pressure receiving pockets, said grooves are opened toward the outer periphery of said ring, pressurized medium is supplied to said grooves from said fluid supply means and said pressurized medium is supplied to said radial bearing pockets through variable throttle means formed between said floating ring and said ring.

6. A static fluid pressure bearing according to claim 2 wherein a plurality of thrust receiving pockets are formed on the thrust receiving surfaces opposing the opposite end surfaces of said floating ring with small clearances therebetween, said thrust receiving pockets formed on one thrust receiving surface and on the other end surface are communicated with one and the other of said thrust bearing pockets, second variable throttle means is formed between the opposite end surface of said floating ring and the periphery of said thrust receiving pockets, and the pressurized medium is supplied to said thrust bearing pockets through said second variable throttle means.

7. A static fluid pressure bearing according to claim 2 wherein on the inner surface of said radial bearing metal are provided with a plurality of radial bearing pockets, a land encircling said plurality of radial bearing pockets, a plurality of discharge lands each formed in each of said plurality of radial bearing pockets, and discharge ports respectively opened on said discharge lands for connecting said radial bearing pockets to a reservoir.

* * * * *